United States Patent Office 3,458,459
Patented July 29, 1969

3,458,459
GLOSS RETAINING URETHANE COATING COMPOSITIONS
George S. Wooster, Hamburg, N.Y., assignor to Allied Chemical Corporation, New York, N.Y., a corporation of New York
No Drawing. Filed Oct. 12, 1965, Ser. No. 495,314
Int. Cl. C08g *17/16, 17/04*
U.S. Cl. 260—21
15 Claims

ABSTRACT OF THE DISCLOSURE

"One-can" coating compositions containing as film formers alkyd resins which are modified by reaction with 4,4'-methylene bis(cyclohexylisocyanate), which compositions give rise to films characterized by an unusual combination of physical properties, notably, superior gloss retention, hardness and compatability with other resins.

Coating compositions derived from alkyd resins and particularly alkyd resins modified by reaction with isocyanates have been prepared but they are deficient in one or more essential physical properties notably gloss retention on weathering and hardness.

---

It is therefore a principal object of this invention to devise novel coating compositions which yield films characterized by having excellent gloss retention on weathering and hardness properties.

Another object is devise novel coating compositions which comprise as the essential film forming component an alkyd resin which has been modified by reaction with 4,4'-methylene-bis-(cyclohexylisocyanate).

Still further objects are to provide processes for the preparation of the novel coating compositions of this invention.

Other objects and advantages ancillary thereto will be obvious from the following description of my invention.

In accordance with the present invention, I have made the surprising discovery that "one-can" coating compositions comprising as the essential film former an alkyd resin which has been modified by reaction with 4,4'-methylene-bis-(cyclohexylisocyanate) produce films which are not only color stable but also possess surprisingly improved gloss retention and hardness compared to similar films derived from unmodified alkyd resins or from alkyd resins modified by reaction with other aliphatic polyisocyanates.

In co-pending U.S. application Ser. No. 290,155, filed June 24, 1963 now U.S. Patent 3,346,524, coating compositions comprising the reaction product of polyesters of fatty acids and 4,4'-methylene bis-(cyclohexylisocyanate) were prepared and found to have improved properties such as good gloss retention and color stability. However, these compositions are of the "two-can" coating class, i.e. the isocyanate component and the polyester component are separately prepared and admixed in the desired proportions just prior to application. Since the isocyanate component necessarily contains free isocyanate groups permitting curing by reaction of these groups with moisture in the air, crosslinking agents, etc., it is necessary to employ stabilizers, etc. to prevent reaction of these groups prior to their application in coating compositions. The novel compositions of this invention are of the "one-can" coating class, i.e. they may be applied to various substrata directly and comprise stable, organic solvent-soluble resin systems which contain substantially no free isocyanates and may be conveniently stored prior to application. The "one-can" compositions of this invention have the additional advantage of having a fast curing rate and, in general, form films having a good surface feel. The novel compositions may be applied by conventional methods i.e., by spraying, brushing, dipping, flow-coating and the like. The films are cured or dried by conventional methods, i.e., oxidation at points of unsaturation or in the instance of saturated polyesters by combining with other resins, e.g. urea-formaldehyde or melamine-formaldehyde resins, and baking at suitable elevated temperatures. When cured, the coatings derived from the novel compositions of my invention are tough and flexible as expected of urethane coatings, nonyellowing and surprisingly they retain their glossy appearance for extended periods of time.

Alkyd resins are kell known synthetic polymers produced, generally, by the reaction of polybasic acids or anhydrides with polyhydric alcohols. Thus, polybasic acid or anhydrides such as phthalic anhydride, isophthalic acid, maleic anhydride, adipic acid, trimellitic acid and mixtures thereof are reacted with a polyhydric alcohol such as ethylene glycol, propylene glycol, glycerine, trimethylolpropane, pentaerythritol and the like and mixtures thereof either by direct fusion of the materials ("fusion") or by reacting in the presence of an azeotropic solvent ("solvent reflux method") with the removal of water of esterification. The reaction is generally continued until the desired viscosity, acid value, etc. are attained. Modifying agents, such as fatty acids, e.g., lauric acid, pelargonic acid, mixtures of fatty acids derived from vegetable oils such as soya oil, linseed oil, drying oils or non-drying oils such as linseed oil, soya oil, cottonseed oil and the like, may be added to impart special properties such as improved drying, better water resistance, color retention and the like.

A general discussion of the preparation and utilization of alkyd resins is contained in "Polymers and Resins" Goulding, pp. 295–303 (D. V. VanNostrand, 1959).

Of especial value and utility as a film former in coating compositions and preferred herein is the alkyd resin derived by condensation of phthalic anhydride and trimethylol propane modified with lauric acid. The resultant polyester has an acid number below 10.

The film-formers of this invention are prepared by replacing a substantial portion from about 10 to about 50 mole percent of the polybasic acid component, preferably about 25 mole percent, with 4,4'-methylene bis(cyclohexylisocyanate). The resultant compositions when incorporated into coating compositions in the conventional manner, i.e., by solution in low boiling solvents, addition of driers, pigments and the like, give rise to coatings distinguished by their surprisingly excellent gloss retention character and hardness. These novel coatings retain their valuable characteristic of being compatible with other film forming resins, e.g., urea-formaldehyde or melamine-formaldehyde and the mixtures possess the desired enhanced gloss retention characteristic. When amounts of polybasic acid are replaced substantially in excess of 50 mole percent, a resin results having poor solubility and compatibility with other resins such as the urea-formaldehyde, etc. mentioned above and such amounts are therefore to be avoided.

The "one-can" coating compositions of my invention are applied in the manner of the conventional "one-can" formulations. Thus the coating, formulated as desired by incorporation therewith of pigments, driers, ultra violet absorbers, fungicides, other resins, etc., is applied to substrata, and the applied film, dried and/or cured by evaporation of the solvent vehicle in air or by exposure to heat e.g., in a baking oven.

In accordance with a preferred mode of carrying out the process of my invention a mixture of the polyhydric alcohol and polybasic acid or anhydride components together with a fatty acid modifier are heated with an azeotroping solvent, preferably xylene, to a temperature of about 200° C. Water formed in the reaction is constantly distilled from the mixture together with the solvent which after condensation and separation of the water therefrom is returned to the boiling reaction mixture. The reaction is continued until the acid number of the mixture is below 10 after which the mass is cooled to below 150° C. and the desired amount of 4,4'-methylene-bis(cyclohexylisocyanate), preferably as a 50% solvent solution, is added slowly to the mixture. The resulting mass is agitated at a temperature below about 150° C., preferably at about 130° to 135° C., until the isocyanate has reacted substantially completely. The reaction of the isocyanate can be conveniently followed by examination of the infrared absorption of the mass at 4.45 mu. Disappearance of the characteristic peak due to the isocyanato group at 4.45 mu is an indication of the completion of the reaction. The reaction mixture is thereafter diluted with a suitable solvent, e.g. xylene, to a convenient solid content, e.g. 50% non-volatiles.

The novel coating compositions comprise a volatile solvent as a carrier for the film forming resin or mixture thereof with other resins. Suitable solvents for this purpose include the usual lacquer type organic solvents, typical examples of which are ethyl acetate, butyl acetate, isopropanol, n-butanol, cyclohexanone, toluene, xylene, bis(B-ethoxyethyl) ether, glycol monoethyl ether acetate, and the like. Mixtures of these and equivalent solvents can be used also.

Xylene, because of its ready availability, low cost, and utility as a water azeotroping agent in the polyester formation step of the process, is the preferred solvent in this connection.

The following examples illustrate the present invention. Parts and percentages are by weight and temperatures are given in degrees centigrade.

EXAMPLE 1

A series of coating compositions were prepared from the components set out in Table 1 below by the following procedure:

All the components of the reaction mass, except the polyisocyanate where used, were charged to the reaction vessel, equipped with an agitator, condenser, Dean-Stark water separator, and solvent return tube. About 5 to 10 mols of xylene per mole of anhydride were added as the azeotropic solvent to assist in the removal of water. The mixture was agitated and heated to 200° ±5°. A mixture of xylene and water was distilled from the mass, condensed, and after separation of water, the solvent was returned to the boiling mixture. The reaction was continued until the acid number of the reaction mixture was 10 or less. The mass then was cooled to about 130° to 135° and a 50% solution of the diisocyanate in xylene was added dropwise during about 2 hours. The resulting mixture was agitated for about 3 additional hours at 130° to 135°, to complete the reaction, additional hours at 130° to 135°, to complete the reaction as indicated by the disappearance of the isocyanate peak at 4.45 microns from the infra-red absorption spectra of the reaction product. Thereafter the mixture was cooled to ambient temperature and diluted with xylene to a 50% non-volatile solution.

All of the above prepared solutions when admixed with a commercially available melamine resin (Plaskon #3381) in the ratio of 80 parts of urethane resin to 20 parts of melamine resin gave clear solutions which when applied to a suitable substrate gave clear films. The isocyanate modified alkyds therefore, are compatable with this type of resin, a highly desirable quality.

EXAMPLE 2

The effect on film hardness obtained by modifying the basic alkyd resin with 4,4'-methylene bis-(cyclohexylisocyanate) was demonstrated by applying the urethane/melamine coating compositions prepared in Example 1 above, by the conventional draw-down technique on polished steel test panels. A 3 mil wet film was applied. The films were cured by baking according to the following schedules:

(1) ½ hour at 121°
(2) ½ hour at 150°
(3) ½ hour at 121° then 1 hour at 177°
(4) ½ hour at 150° then 1 hour at 177°

TABLE 2.—SWARD ROCKER HARDNESS[1] OF CURED FILMS

|  | Cured by bake schedule | | | |
|---|---|---|---|---|
|  | (1) | (2) | (3) | (4) |
| Unmodified alkyd resin, A | 10 | 13 | 18 | 18 |
| Urethane resins: | | | | |
| B | 10 | 10 | 16 | 14 |
| C | 22 | 24 | 29 | 29 |
| D | 25 | 26 | 33 | 31 |
| E | 27 | 29 | 40 | 40 |
| F | 28 | 28 | 32 | 32 |

[1] "Physical and Chemical Examination of Paints, Varnishes, Lacquers & Colors," Gardner and Sward, 11th Ed., 1950. pages 164–66.

These results indicate that whereas 4,4'-methylene-bis-(cyclohexylisocyanate) modified alkyd resins (C to G) are superior in hardness to the unmodified alkyds (A), 1,6-hexamethylene diisocyanate (B), another alkylene diisocyanate, is of little or no effect as a modifier of alkyd resins, in this respect.

EXAMPLE 3

The urethane/melamine resin coating compositions described in Example 1 above were pigmented by dispersing 32.5 parts of a commercially available titanium dioxide pigment ("Ti-Pure" R-900-duPont) in 67.5 parts of the isocyanate modified alkyd-melamine coating compositions. In the conventional manner 3 mil wet films were applied to unprimed aluminum panels by the draw down technique and the films cured by the bake schedule given in Example 2 above. The coated panels were then exposed in an Atlas "Weather-Ometer" to accelerated weathering conditions for 1930 hours. The exposed panels were washed in tap water and dried with a cotton cloth and then examined for gloss and color retention.

Gloss was measured by means of a General Electric Portable Glossmeter with a 60° head (Refer to ASTM D1471-57T).

Color retention was determined using a Hunter Multipurpose Reflectometer using an amber-blue and a green filter. The ratio of the value obtained X100 is reported, the lower the number the less yellowing (i.e. the better color retention) of the film occasioned by the accelerated

TABLE 1

| Component | Molar proportions | | | | | |
|---|---|---|---|---|---|---|
|  | A | B | C | D | E | F |
| Lauric acid | 1.5 | 1.5 | 1.5 | 1.5 | 0 | 1.5 |
| Pelargonic acid | 0 | 0 | 0 | 0 | 1.5 | 0 |
| Phthalic anhydride | 2.0 | 1.5 | 1.5 | 1.5 | 1.5 | 1.5 |
| Trimethylolpropane | 2.25 | 2.25 | 2.25 | 0 | 2.25 | 2.15 |
| Trimethylolethane | 0 | 0 | 0 | 2.25 | 0 | 0 |
| 4,4'-methylene-bis-(cyclohexyisocyanate) | 0 | 0 | 0.5 | 0.5 | 0.5 | 0.5 |
| 1,6-hexamethylenediisocyanate | 0 | 0.5 | 0 | 0 | 0 | 0 |
| Acid number of resin | 3.5 | 3.2 | 2.8 | 3.5 | 4.4 | 4.1 |
| Gardner viscosity [1] | A | D | L–M | U–V | I–J | N |

[1] Of 50% non-volatile solution of resin in xylene; "Physical and Chemical Examination of Paints, Varnishes, Lacquers and Colors," Gardner and Sward, 11th Ed., 1950, page 300.

weathering. (Refer to ASTM D1260–55T). The data obtained is given in the following Tables 3 and 4.

TABLE 3.—GLOSS RETENTION AFTER ACCELERATED WEATHERING

| | Cured according to bake schedule | | | |
|---|---|---|---|---|
| | 1 | 2 | 3 | 4 |
| Unmodified alkyd resin, A | 20 | 43 | 52 | 48 |
| Urethane resins: | | | | |
| B | 46 | 54 | 63 | 62 |
| C | 79 | 81 | 69 | 72 |
| D | 75 | 76 | 64 | 67 |
| E | 69 | 67 | 69 | 71 |
| F | 78 | 78 | 72 | 71 |

These data clearly demonstrate the superior gloss retention on weathering character of the novel coating compositions of my invention, especially when compared to a typical unmodified alkyd or one modified with a polyisocyanate other than 4,4′-methylene-bis(cyclohexylisocyanate).

TABLE 4.—COLOR RETENTION AFTER ACCELERATED WEATHERING

[Amber-blue/green]×100

| | Cured by bake schedule | | | |
|---|---|---|---|---|
| | 1 | 2 | 3 | 4 |
| Unmodified alkyd resin, A | 5.04 | 6.18 | 4.94 | 3.19 |
| Urethane resins: | | | | |
| B | 4.31 | 3.71 | 0.78 | 0.34 |
| C | 2.06 | 2.23 | 0.56 | 1.12 |
| D | 1.92 | 1.78 | 0.55 | 0.55 |
| E | 0.79 | 0.55 | 0.22 | 0.11 |
| F | 2.83 | 1.70 | 1.22 | 0.89 |

These data clearly show the good color retention property of the novel isocyanate modified alkyds when present in pigmented coating compositions. This well known characteristic of alkylene polyisocyanates is, of course, to be expected, but the general superiority of those resins modified by 4,4′-methylene-bis-(cyclohexylisocyanate) especially when cured by mild baking schedules over those modified with 1,6-hexamethylene-diisocyanate is a surprising useful attribute of the novel coating compositions of this invention.

EXAMPLE 4

A mixture of 1.29 mols of lauric acid, 1.93 mols of phthalic anhydride, and 2.9 mols of trimethylolethane was heated, together with sufficient xylene to provide an azeotropic distillate, to and maintained at 200°±5° for four hours. The xylene-water distillate after condensation was permitted to separate into component layers, the xylene layer being returned to the reaction mixture. The acid number of the batch was about 6. It was cooled to about 65°. To this mass was added a solution of 0.5 parts of dibutyltin dilaurate in 500 parts of xylene followed by the dropwise addition of a 50% solution of 0.65 mol of 4,4′-methylene-bis-(cyclohexylisocyanate) in xylene. This latter addition required about 2 hours during which period the mixture was agitated at 70°±5°. Thereafter the mass was heated to and maintained at 90° to 95° for 2 hours. The resulting product, which contained no free isocyanato groups as indicated by the absence of a peak at 4.45 microns in the infra-red absorption spectra of the mass, was diluted with about 200 parts of n-butanol to a non-volatile solid content of 50%.

This isocyanate modified alkyd resin solution had the following characteristics:

Color (Gardner Scale) <1
Viscosity (Gardner-Holt) x–y
Acid No., 6.2

The resin solution was mixed with a commercial melamine resin (Plaskon #3381) to provide a resin mixture in the ratio of 17% melamine and 83% isocyanate modified alkyd. This mixture was diluted sufficient of an 80% 20 xylene-n-butanol solvent mixture to provide a 30% non-volatile coating composition. This composition had a viscosity (Gardner-Holt) at 25° of A—.

The film properties of this coating composition were evaluated by application to a steel panel by the dip coating technique and the wet film was cured by baking at 120° for ½ hour. The resultant cured film had a Sward Hardness of 48–50, it was resistant to finger nail marring. The film had a pleasing surface feel and good flexibility as tested by scraping with a knife blade.

It can thus be seen that novel and eminently useful urethane coating compositions have been devised. The above examples and numerous variations alluded to in this specification have been given for the purpose of illustrating the scope of the invention. Other variations in the details set out above can be made as will be obvious to those skilled in this art. Such variations which do not depart from the spirit of the invention are to be included within the scope thereof which is to be limited only by the claims appended hereto.

We claim:

1. A "one-can" coating composition characterized by the formation of films therefrom having excellent retention of gloss on weathering and hardness properties comprising as the essential film former the reaction product of an alkyd resin, said resin being derived from the condensation of a polybasic acid or anhydride with a polyhydric alcohol together with a fatty acid, said alkyd resin having an acid number no greater than about 10, and 4,4′-methylene-bis(cyclohexylisocyanate), in an amount equivalent to about 10 to about 50 mole percent of the polybasic acid or anhydride of said resin.

2. The composition of claim 1 wherein said alkyd resin is derived from the condensation of (1) a member selected from the groups consisting of phthalic anhydride, isophthalic acid, maleic anhydride, adipic acid, trimellitic acid and mixtures thereof with (2) a member selected from the group consisting of ethylene glycol, propylene glycol, glycerine, trimethylolpropane, pentaerythritol and mixtures thereof, in the additional presence of (3) a member of the group consisting of lauric acid, pelargonic acid and mixtures of fatty acids derived from vegetable oils.

3. The composition of claim 2 in admixture with a member of the group consisting of urea-formaldehyde resin and melamine-formaldehyde resin in a ratio of urethane resin to formaldehyde resin of about 80 to 20.

4. The composition of claim 2 dissolved in an inert organic solvent.

5. The composition of claim 2 wherein the amount of said isocyanate is equivalent to about 25 mole percent of the polybasic acid or anhydride of the alkyd resin.

6. A "one-can" coating composition characterized by the formation of films therefrom having excellent retention of gloss on weathering and hardness properties comprising as the essential film former the reaction product of an alkyd resin, said resin being derived from the condensation of about 1.5 moles of phthalic anhydride, about 2.25 moles of trimethylolpropane and about 1.5 moles of lauric acid, said resin having an acid number no greater than 10, with 4,4′-methylene bis(cyclohexylisocyanate), in an amount equivalent to about 10 to about 50 mole percent of the anhydride of said resin.

7. The composition of claim 6 in admixture with melamine-formaldehyde resin in a ratio of urethane resin to formaldehyde resin of 80 to 20.

8. The composition of claim 6 in an inert organic solvent.

9. The composition of claim 6 wherein the amount of said isocyanate is equivalent to about 25 mole percent of the anhydride of said resin.

10. A method of producing "one-can" coating compositions characterized by the formation of films therefrom having excellent retention of gloss on weathering and hardness properties comprising reacting an alkyd resin, said resin being derived from the condensation of a polybasic acid or anhydride with a polyhydric alcohol together with a fatty acid and having an acid number no greater than 10, in an inert organic solvent, with 4,4′-methylene-bis(cyclohexylisocyanate) in an amount equivalent to from about 10 to about 50 mole percent of the polybasic acid or anhydride of said resin, at a temperature below about 150° C., and continuing said reaction until there are no free isocyanate groups in the reaction product.

11. The method of claim 10 wherein said reaction product is cured by cross-linking with a member of the group consisting of urea-formaldehyde resin and melamine-formaldehyde resin.

12. The method of claim 10 wherein the alkyd resin is derived from the condensation of phthalic anhydride, trimethylolpropane and lauric acid.

13. The method of claim 10 conducted at a temperature of about 130 to 135° C.

14. The method of claim 10 wherein said alkyd resin is derived from the condensation of (1) a member selected from the group consisting of phthalic anhydride, isophthalic acid, maleic anhydride, adipic acid, trimellitic acid and mixtures thereof with (2) a member selected from the group consisting of ethylene glycol, propylene glycol, glycerine, trimethylolpropane, pentaerythritol and mixtures thereof, in the additional presence of (3) a member of the group consisting of lauric acid, pelargonic acid and mixtures of fatty acids derived from vegetable oils.

15. The method of claim 14 wherein the amount of isocyanate is equivalent to about 25 mole percent of the polybasic acid or anhydride of said resin.

References Cited

UNITED STATES PATENTS

| | | | |
|---|---|---|---|
| 2,970,123 | 1/1961 | Rhodes et al. | 260—22 |
| 2,981,712 | 4/1961 | Harper | 260—22 |
| 3,224,988 | 12/1965 | Skreckoski | 260—22 |
| 3,318,828 | 5/1967 | Seiner | 260—22 |
| 3,346,524 | 10/1967 | Skreckoski | 260—22 |
| 3,349,049 | 10/1967 | Seiwert et al. | 260—22 |

FOREIGN PATENTS 547,672  9/1942  Great Britain.

DONALD E. CZAJA, Primary Examiner

R. W. GRIFFIN, Assistant Examiner

U.S. Cl. X.R.

106—18; 117—134, 167; 260—22, 31.2, 33.2, 33.4, 33.6, 39, 40

UNITED STATES PATENT OFFICE
CERTIFICATE OF CORRECTION

Patent No. 3,458,459                                July 29, 1969

George S. Wooster

It is certified that error appears in the above identified patent and that said Letters Patent are hereby corrected as shown below:

Column 3, lines 57 and 58, cancel "additional hours at 130° to 135°, to complete the reaction". Column 4, line 53, "1930" should read -- 1030 --; line 61, "value" should read -- values --. Column 5, line 72, after "diluted" insert -- with --. Column 6, line 26, "and" should read -- with --.

Signed and sealed this 5th day of May 1970.

(SEAL)
Attest:

Edward M. Fletcher, Jr.                       WILLIAM E. SCHUYLER, JR.
Attesting Officer                                Commissioner of Patents